United States Patent
Elsaesser et al.

(10) Patent No.: US 10,253,662 B2
(45) Date of Patent: Apr. 9, 2019

(54) PUMP DEVICE FOR DRIVING BLOW-BY-GAS

(71) Applicant: Mahle International GmbH, Stuttgart (DE)

(72) Inventors: Alfred Elsaesser, Keltern (DE); Volker Kirschner, Muehlacker (DE); Thomas Riemay, Korb (DE); Stefan Ruppel, Heidelberg Emmertsgrund (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/551,902

(22) PCT Filed: Feb. 3, 2016

(86) PCT No.: PCT/EP2016/052280
§ 371 (c)(1),
(2) Date: Aug. 17, 2017

(87) PCT Pub. No.: WO2016/131654
PCT Pub. Date: Aug. 25, 2016

(65) Prior Publication Data
US 2018/0030868 A1 Feb. 1, 2018

(30) Foreign Application Priority Data
Feb. 18, 2015 (DE) .................. 10 2015 202 946

(51) Int. Cl.
*F01M 13/02* (2006.01)
*B01D 45/08* (2006.01)
(Continued)

(52) U.S. Cl.
CPC .......... *F01M 13/021* (2013.01); *B01D 45/08* (2013.01); *F01M 11/0004* (2013.01);
(Continued)

(58) Field of Classification Search
CPC .. F01M 13/021; F01M 13/04; F01M 11/0004; F01M 2013/026;
(Continued)

(56) References Cited

U.S. PATENT DOCUMENTS

| 6,973,925 B2 | 12/2005 | Sauter et al. |
| 8,607,767 B2 | 12/2013 | Ruppel et al. |

(Continued)

FOREIGN PATENT DOCUMENTS

| DE | 10044615 A1 | 4/2002 |
| DE | 10153120 A1 | 9/2002 |

(Continued)

OTHER PUBLICATIONS

English abstract for JP-H11141325.
English abstract for DE-10153120.

*Primary Examiner* — Jacob Amick
*Assistant Examiner* — Charles Brauch
(74) *Attorney, Agent, or Firm* — Fishman Stewart PLLC (57) ABSTRACT

A pump device may include a side channel compressor that may include a housing having a conveying chamber and a fluid inlet and outlet. The compressor may include an impeller having blades radially on an outside and which may be mounted rotatably in the housing, the blades lying in the conveying chamber, and a shaft mounted rotatably about an axis of rotation and on which the impeller may be fastened. The conveying chamber may have at least one side channel running in a region of the blades and connecting the fluid inlet and outlet to one another in a circumferential direction. An intermediate region may be formed in the circumferential direction between the fluid inlet and outlet and in which a distance of the blades in an axial direction to the nearest wall may be such that no more than a predetermined amount of fluid flows in the intermediate region.

20 Claims, 9 Drawing Sheets

(51) Int. Cl.
   *F01M 11/00* (2006.01)
   *F01M 13/04* (2006.01)
   *F04D 25/04* (2006.01)
   *F04D 29/28* (2006.01)
(52) U.S. Cl.
   CPC ............ *F01M 13/02* (2013.01); *F01M 13/04* (2013.01); *F04D 25/045* (2013.01); *F04D 29/284* (2013.01); *F01M 2013/026* (2013.01); *F01M 2013/0427* (2013.01)
(58) Field of Classification Search
   CPC .......... F01M 2013/0427; F04D 29/284; F04D 25/045; B01D 45/08
   See application file for complete search history.

(56) References Cited

U.S. PATENT DOCUMENTS

| | | | |
|---|---|---|---|
| 2003/0178014 A1* | 9/2003 | Sauter | B04B 5/12 |
| | | | 123/572 |
| 2004/0112346 A1 | 6/2004 | Ahlborn et al. | |
| 2007/0059154 A1 | 3/2007 | Krines et al. | |
| 2009/0000300 A1 | 1/2009 | Hilpert | |
| 2010/0221097 A1 | 9/2010 | Dittmar et al. | |
| 2010/0294218 A1* | 11/2010 | Ruppel | F01M 13/021 |
| | | | 123/41.86 |
| 2013/0152563 A1* | 6/2013 | Sloss | F01N 13/102 |
| | | | 60/323 |

FOREIGN PATENT DOCUMENTS

| | | |
|---|---|---|
| DE | 20302824 U1 | 7/2004 |
| DE | 202005001604 U1 | 6/2006 |
| DE | 602004004102 T2 | 7/2007 |
| DE | 102006024816 A1 | 12/2007 |
| DE | 102007030277 A1 | 1/2009 |
| DE | 102007053017 A1 | 5/2009 |
| EP | 1789683 B1 | 6/2010 |
| JP | H11141325 A | 5/1999 |
| WO | WO-02/070871 A2 | 9/2002 |

* cited by examiner

PUMP DEVICE FOR DRIVING BLOW-BY-GAS

REFERENCE TO RELATED APPLICATIONS

This application claims priority to International Patent Application No. PCT/EP2016/052280, filed on Feb. 3, 2016, and German Patent Application No. DE 10 2015 202 946.8, filed on Feb. 18, 2015, the contents of both of which are incorporated herein by reference in their entireties.

TECHNICAL FIELD

The invention relates to a pump device for driving blow-by gas in a crankcase ventilation apparatus comprising a side channel compressor having a housing which has a conveying chamber, a fluid inlet and a fluid outlet, having an impeller which has blades radially on the outside and which is mounted rotatably in the housing, wherein the blades lies in the conveying chamber, and having a shaft which is mounted rotatably about an axis of rotation and on which the impeller is fastened, wherein the conveying chamber has at least one side channel which runs in the region of the blades and connects the fluid inlet and the fluid outlet to one another. Furthermore the invention relates to an oil separating device having such a pump device and a crankcase ventilation apparatus having such an oil separating device.

BACKGROUND

Most motor vehicles are fitted with an internal combustion engine which usually provides for the drive of the vehicle. Such an internal combustion engine, preferably when this is fitted as a piston engine, has a crankcase. Located in the crankcase is a crankshaft which is connected to pistons of the individual cylinders of the internal combustion engine via connecting rods. Leaks between the pistons and the appurtenant cylinder walls result in a blow-by gas stream by means of which blow-by gas passes from the combustion chambers into the crankcase. In order to avoid inadmissible excess pressure in the crankcase, modern internal combustion engines are fitted with a crankcase ventilation apparatus in order to remove the blow-by gases from the crankcase.

In order to reduce harmful emissions, with the aid of the crankcase ventilation apparatus the blow-by gas is not supplied to the surroundings but usually to a fresh air system of the internal combustion engine which supplies the combustion chambers of the internal combustion engine with fresh air.

An oil mist prevails in the crankcase so that the blow-by gas entrains oil. This oil in the form of oil droplets can damage elements in the intact tract such as for example a turbocharger. In order to protect these elements and reduce the oil consumption, the crankcase ventilation apparatus usually has an oil separating device and preferably an oil return which returns the separated oil to the crankcase.

In the case of crankcase ventilation apparatuses, a distinction can fundamentally be made between passive systems and active systems. Passive systems use the pressure difference between the crankcase and the negative pressure of the fresh air system to drive the blow-by gases. Active systems additionally produce a negative pressure for extracting the blow-by gas from the crankcase. As a result, a higher pressure difference can be used for the oil separation so that the separation is improved. The pressure differences which can be achieved in this way are nevertheless limited since the maximum negative pressure which can be produced is limited.

It is the object of the invention to provide an improved or at least different embodiment for a pump device of the type mentioned initially which in particular is characterized by an increased efficiency with regard to oil separation.

This object is solved according to the invention by the subject matters of the independent claims. Advantageous embodiments are the subject matter of the dependent claims.

SUMMARY

The invention is based on the general idea of using a side channel compressor for driving the blow-by gas and optimizing this for use to drive blow-by gases. Side channel compressors can produce high pressure differences even with a compact design so that a particularly compact crankcase ventilation apparatus can be achieved as a result.

One favourable possibility provides that the pump device has at least one oil drain through which oil can drain from the conveying chamber. In this way, gas containing oil mist, so-called blow-by gas, can be pumped with the pump device. Thus, the pump device can be used fluidically between a crankcase and an oil separator. In this case, the pump device can in particular already also function or be used as an oil separator, for example, as a first stage.

A particularly favourable variant provides that the oil drains are each arranged at a lowest point of the conveying chamber in the direction of gravity. The direction of gravity relates to the subsequent installation position. As a result, the oil which possibly collects in the conveying chamber and the side channels can drain through the oil drains.

An advantageous variant provides that the oil drain guides oil separated in the side channel compressor into an oil return which returns the oil to an oil cycle. By this means, the oil consumption can be reduced since the oil is further used.

A favourable solution for the efficiency of the side channel compressor provides that at least one fin is arranged in the side channel which extends at least in sections obliquely to a circumferential direction. The at least one fin arranged in the side channel disturbs the flow of the gases to be pumped in the circumferential direction inside the side channel so that the gases in the side channel can flow radially inwards largely without pressure loss where they can again be driven by the impeller in order to again experience a pressure gain.

Another favourable possibility provides that the at least one fin in the side channel separates at least two chambers open towards the impeller from one another. The formation of the chambers in the side channel supports the circulation of the blow-by gas in the side channel so that in certain operating states the efficiency of the side channel compressor is improved.

Another favourable variant provides that the pump device has an oil drain in at least one side channel for each chamber through which oil can drain from the respective chamber. Thus, no oil which can hinder the operation of the pump device can collect in any chamber. Only the oil drains are required in a side channel arranged at the bottom in the installed state since the oil can escape from the chambers of a side channel arranged at the top in the installed state in the direction of the impeller from the chambers open to the impeller.

Another favourable possibility provides that the housing has an insert part which is inserted into the conveying chamber and comprises at least one fin. In this way, stable and precise fins or contours for the conveying chamber can be formed in a very simple manner.

A particularly favourable possibility provides that the insert part forms at least one part of the side channel. The insert part can be fabricated with high precision and can be fabricated for example from a high-strength material so that the side channel can be formed very precisely and stably.

Another particularly favourable possibility provides that the housing and the at least one insert part comprise different materials. As a result, more favourable materials can be used for the housing which in particular can be processed more favourably in mass production. Whereas materials which have the required stability and precision which is necessary to form the side channel can be used for the insert part.

An advantageous solution provides that the housing consists of more than 50% plastic or composite plastic, for example fibre-reinforced plastic. Plastic or composite plastic is a favourable material which is particularly suitable for mass production. As a result, the side channel compressor can be manufactured particularly cost-effectively.

A further advantageous solution provides that at least one fin is formed from the same material as the housing. As a result, the fins can also be manufactured cost-effectively. It is particularly advantageous if the fin is injection-moulded onto the insert part.

A particularly advantageous solution provides that the pump device has two opposite side channels and wherein in particular it can be provided that at least one fin is arranged in each of the two side channels, which extends at least in sections obliquely to the circumferential direction. Preferably the fins separate in each case at least two chambers opens to the impeller from one another. Thus, the efficiency-enhancing effect of the chambers or the fins in two side channels can be utilized. The efficiency of the side channel compressor is therefore further increased.

Preferably the installation position of the pump device is such that the axis of rotation of the impeller runs substantially vertically. The side channels then lie above and/or below the blades of the impeller. The formulation "substantially vertically" here covers deviations from the vertical direction of a maximum of 15° or a maximum of 10° or a maximum of 5°.

An advantageous possibility provides that the pump device has a drive unit which is coupled to the shaft. In this way, a particularly compact design of the pump device can be achieved. For example, the drive unit can be formed by a hydraulic motor, an electric motor, a pneumatic motor or by a drive coupling to the internal combustion engine.

A particularly advantageous possibility provides that the drive unit comprises a turbine wheel, in particular a Pelton turbine wheel which is held in a torque-proof manner to and on the shaft. Such a Pelton turbine is particularly suitable if high pressures but only low volume flows are available in the respective drive medium.

Another particularly favourable possibility provides that the pump device has a bearing device which is arranged between the impeller and the drive unit. As a result of this arrangement of the bearing device, a particularly compact design can be achieved.

Another particularly advantageous possibility provides that the shaft is mounted axially and radially by the bearing device. If both the turbine wheel and also the impeller are each held in a torque-proof manner on the shaft, this one bearing device is sufficient to mount both the impeller and also the drive unit so that a particularly compact design can be achieved.

A favourable solution provides that the bearing device comprises needle bearings, plain bearings and/or ball bearings.

Another favourable solution provides that the bearing device comprises precisely one bearing. As a result, an even more compact design of the pump device can be achieved.

A particularly favourable solution provides that the impeller has an annular section between a shaft connection and the blades which runs between the shaft connection and the blades and which in particular connects the shaft connection to the blades, wherein a wall is opposite the annular section in the axial direction, which in particular runs between the impeller and the drive unit, wherein an axial distance between this wall and the annular section varies starting from the axis of rotation in the radial direction. As a result, the axial distance between the wall and the annular section can vary radially and for example be increased towards the shaft connection so that the friction between the wall and the annular section as a result of shear flows is reduced.

A favourable solution provides that the wall in the longitudinal section runs parallel to the axis of rotation obliquely to the annular section and/or in a bent and/or stepped manner. In this way, the varying axial spacing can be achieved simply.

An advantageous variant provides that the wall has a recess relative to the direction of gravity in the installed position. As a result of the recess, the axial distance between the wall and the annular section is increased.

Another advantageous variant provides that the axial distance between the annular section and the wall opposite the annular section is, at least in sections, greater than an axial distance between the annular section and the wall opposite the annular section in the region of a sealing device. Such a distance reduces the friction losses as a result of the shear flows between the annular section and the wall to a sufficient extent.

Furthermore, the aforesaid object is solved by a crankcase ventilation apparatus having a pump device and having an inertia-based oil separator. Such a crankcase ventilation apparatus can particularly benefit from the advantages of the pump device, reference being made to the preceding description thereof in this respect.

A favourable possibility provides that the inertia-based oil mist separator is arranged downstream of the pump device. Since the inertia-based oil mist separator is arranged downstream of the pump device, the pump device functions as a first oil separation stage so that a two-stage oil separation can be achieved which can particularly effectively separate oil mist from the gas flow, for example, the blow-by gas flow. In addition, an increased pressure difference can be present at the oil mist separator, which allows more effective separation of the oil mist.

Another favourable possibility provides that the inertia-based oil mist separator is an impactor. An impactor is an inertia-based oil separator in which an improved separation rate is achieved with an increased pressure difference between inlet and outlet. Thus, the effects of the pump device can be optimally utilized.

A particularly favourable possibility provides that the impactor has nozzles which are open at least partially permanently and through which the gas flow flows, the impactor has at least one baffle plate arranged opposite the nozzle which deflects the gas flow and on which fluid droplets are deposited. Preferably the impactor comprises a spring-loaded poppet valve arranged fluidically parallel to the nozzles, which opens with increasing pressure difference between valve inlet and valve outlet and forms a flow gap through which a part of the gas flow flows and opposite which a baffle plate is arranged which deflects the gas flow and on which fluid droplets are deposited.

An advantageous variant provides that the inertia-based oil mist separator comprises an oil drain which guides oil separated in the oil mist separator to an oil return. Thus, the oil consumption is reduced since the separated oil is not lost.

Another advantageous variant provides that the oil drain guides the oil into a drive housing part of the crankcase ventilation apparatus. The drive housing part thereby functions as an oil collecting point from which oil can be returned via the oil return to the oil cycle. As a result, the required number of oil lines is reduced so that a cost-effective and compact design is possible.

A particularly advantageous variant provides that the oil return returns oil from the drive housing part into an oil cycle. As a result, the required number of oil lines is reduced so that a cost-effective and compact design is possible.

A particularly advantageous variant provides that the oil drain of the side channel compressor guides oil into the drive housing part. Thus, the oil separated in the side channel compressor can also be returned centrally via the drive housing part to the oil cycle.

Further important features and advantages of the invention are obtained from the subclaims, from the drawings and from the relevant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are presented in the drawings and are explained in detail in the following description, where the same reference numbers relate to the same or similar or functionally the same components.

BRIEF DESCRIPTION OF THE DRAWINGS

In the figures, in each case schematically

DETAILED DESCRIPTION

Figure 1:
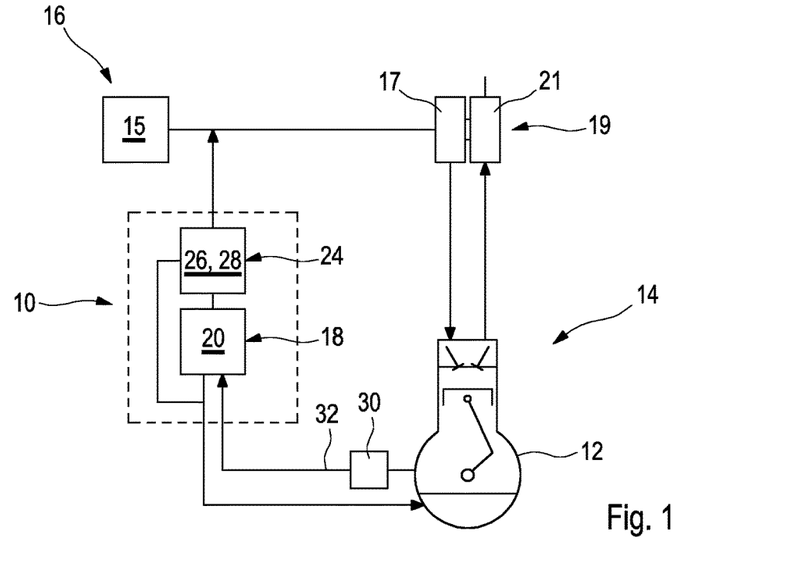
FIG. 1 shows a schematic diagram of a crankcase ventilation apparatus.

The crankcase ventilation apparatus 10 shown in FIG. 1 is used to ventilate a crankcase 12 of an internal combustion engine 14. In this case blow-by gas 32 is removed from the crankcase 12 and freed from an oil mist and supplied to the intake tract 16 of the internal combustion engine 14. The crankcase ventilation apparatus has a pump device 18 which comprises a side channel compressor 20 which is driven by a drive unit 22 and an oil mist separating device 24 which comprises an inertia-based oil mist separator 26, for example, an impactor 28. Further, the crankcase ventilation apparatus 10 has a pressure-regulating valve 30 which prevents the pressure in the crankcase 12 from dropping too much or even taking in oil.

The crankcase ventilation apparatus 10 is arranged in such a manner that blow-by gas 32 from the crankcase 12 is initially guided to the pressure-regulating valve 30 and then flows through the pump device 18 and is driven by the pump device 18, then the compressed blow-by gas 32 is guided through the oil mist separator 26 in which the blow-by gas 32 is freed from oil mist. From the oil mist separator 26 the purified blow-by gas 32 is supplied to the intake tract 16 of the internal combustion engine 14.

In particular, the purified blow-by gas 32 downstream of a filter device 15 of the intake tract 16 is supplied to the intake tract 16. Since the oil mist is largely removed from the blow-by gas 32, the elements arranged downstream of the filter device 15, for example, a compressor 17 of a charging device 19, are protected. For example, FIG. 1 shows an internal combustion engine 14 with a charging device 19 with a compressor 17 and a turbine 21 driven by an exhaust gas stream, i.e. with an exhaust gas turbocharger. However, the crankcase ventilation apparatus 10 according to the invention can also be used in differently charged or non-charged internal combustion engines 14.

Figure 2:
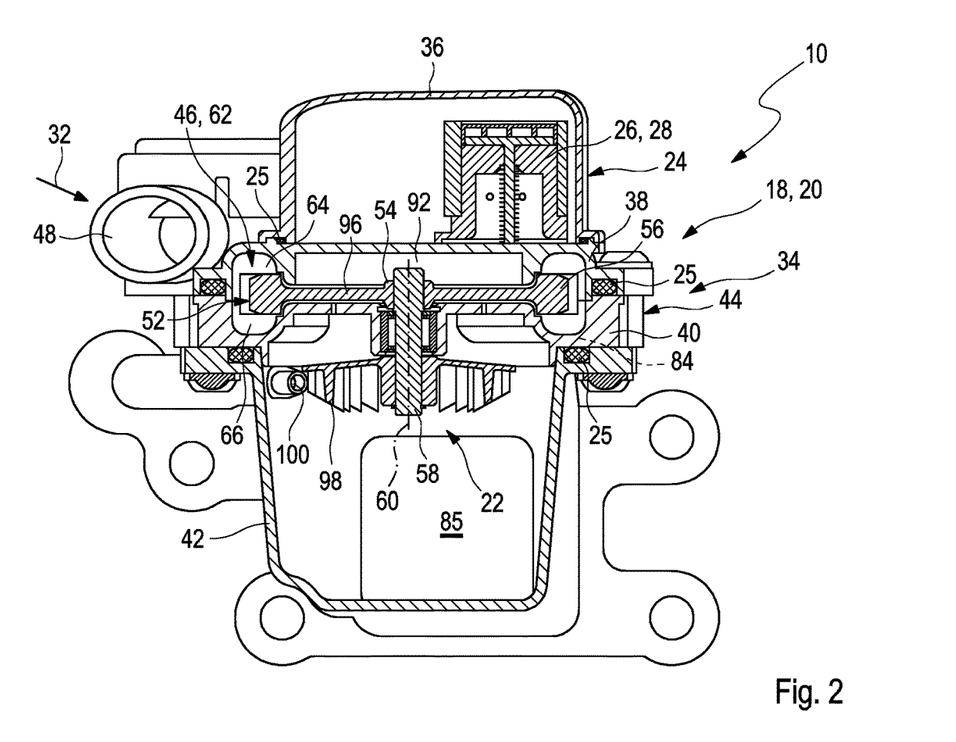
FIG. 2 shows a sectional view through the crankcase ventilation apparatus.
Figure 3:
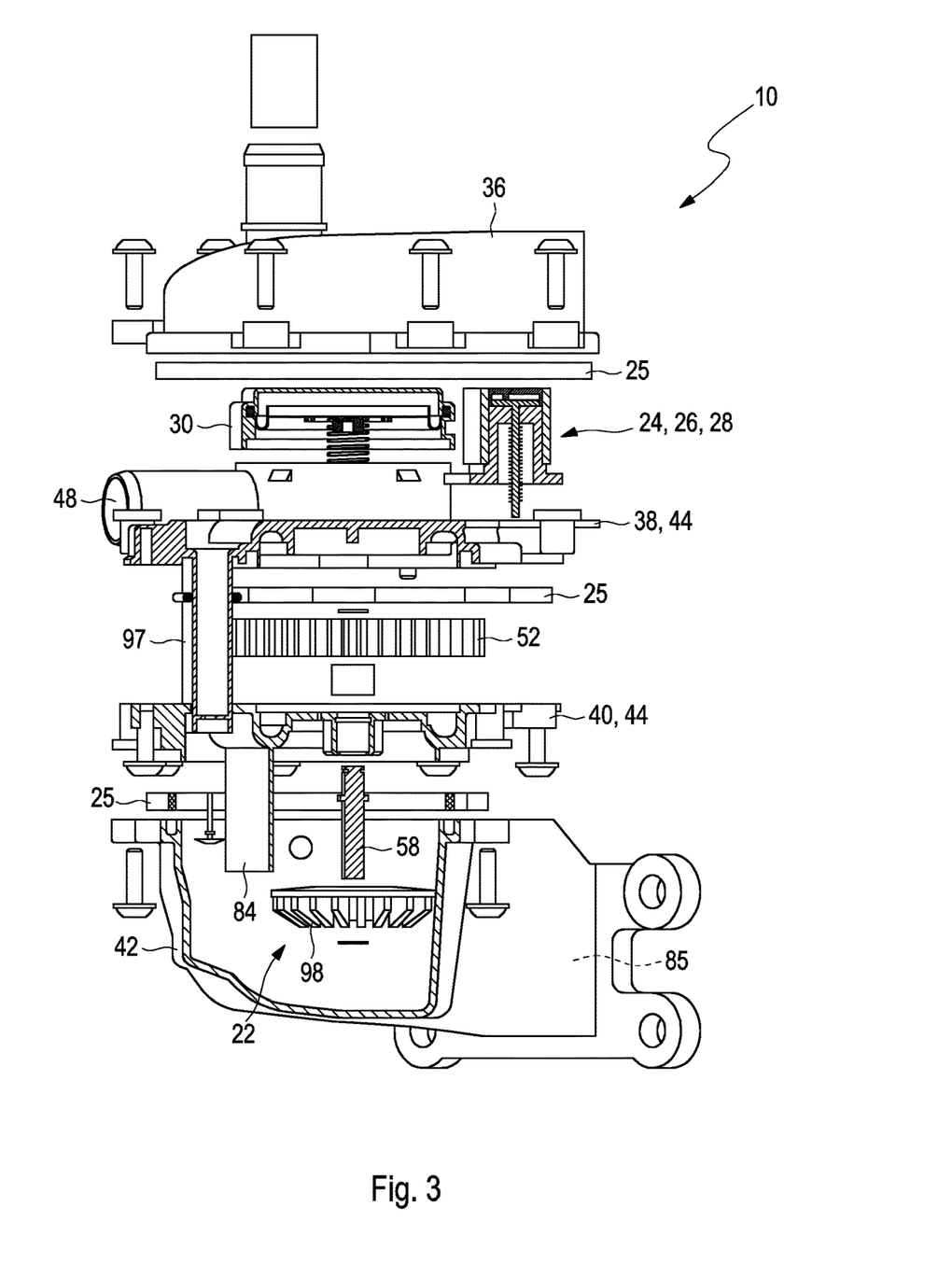
FIG. 3 shows an exploded view of the crankcase ventilation apparatus.

As shown, for example, in FIGS. 2 and 3, the crankcase ventilation apparatus 10 has a housing 34 which is configured to be multipart, for example four-part. The housing 34 has a cover 36 in which the oil mist separator 26 is arranged. Furthermore, the housing 34 comprises an upper part 38 of the side channel compressor 20, a lower part 40 of the side channel compressor 20 and a drive housing part 42 in which the drive unit 22 is arranged. Preferably the individual housing parts are arranged on one another from top to bottom in this order in the direction of gravity. Seals 25 are provided between the individual housing parts which seal an interior of the housing 34 with respect to the surroundings.

Alternatively or additionally to this, it can be provided that the cover is formed in one part with the upper part 38 of the side channel compressor 20 so that required seals and screw connections can be saved as a result.

As shown in FIGS. 3 to 6 for example, the side channel compressor 20 has a housing 44 which is formed by the upper part 38 and the lower part 40. The housing 44 encloses a conveying chamber 46 and has a fluid inlet 48 and a fluid outlet 50 which each have a fluidic connection to the conveying space 46. Furthermore an impeller 52 is arranged in the housing 44 of the side channel compressor 20, which has a shaft connection 54 and radially outer blades 56. An annular section 96 of the impeller 52 connects the shaft connection 54 to the blades 56. The impeller 52 is arranged in such a manner that the blades 56 lie in the conveying chamber 46. Furthermore, the impeller is held on the shaft 58 in a torque-proof manner, which shaft is in turn mounted rotatably about an axis of rotation 60. Consequently the impeller 52 is also rotatable about the axis of rotation 60.

The conveying chamber 46 has at least one side channel 62, for example an upper side channel 64 and a lower side channel 66. The side channels 62 extend in the region of the blades 56 of the impeller 52. In particular, the side channels 62 extend next to the blades 52. When viewed in the circumferential direction, the side channels 62 extend between the fluid inlet 48 and the fluid outlet 50.

Figure 4:
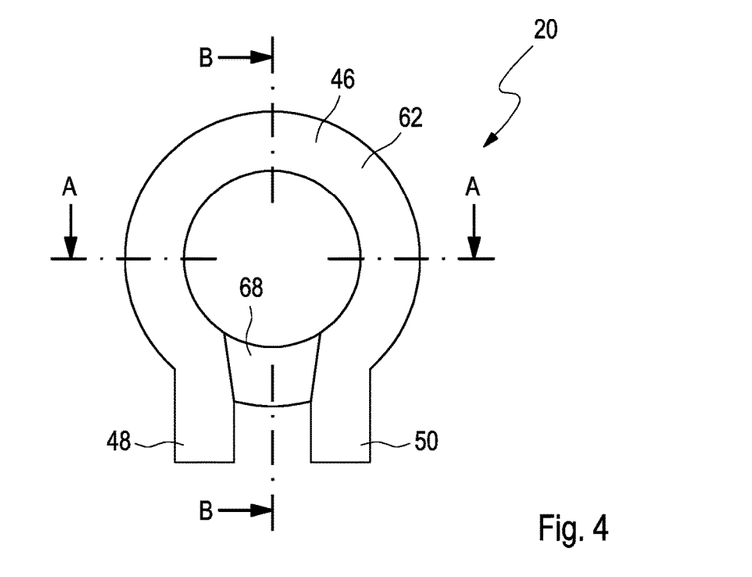
FIG. 4 shows a schematic diagram to illustrate the function of a side channel compressor.

The fluid inlet 48 and the fluid outlet 50 are arranged here in such a manner that they are spaced apart from one another at an angle of less than 90°, particularly preferably less than 60°. The angular information relates to the axis of rotation 60. Consequently there is short connection possibility in the circumferential direction and a long connection possibility.

The side channels 62 connect the fluid inlet 48 and the fluid outlet 50 via the long path. None of the side channels 62 extends in an intermediate region 68 which lies on the short path between the fluid inlet 48 and the fluid outlet 50. In particular, in the intermediate region 68 the distance of the blades in the axial direction to the nearest wall is very small so that none or only small fluid flows occur in this region.

During operation the impeller 52 is rotated about an axis of rotation 60 so that the blades transport the medium to be pumped, for example, blow-by gas 32 from the fluid inlet 48 via the long path to the fluid outlet 50. Through the rotation of the impeller 52, the blow-by gas 32 is compressed radially outwards as a result of the centrifugal force. Since the blades of the impeller 52 are open towards the outside, the blow-by gas 32 can also flow from intermediate spaces between the blades 56 into the side channels 62. In the side channels 62 the blow-by gas 32 is decelerated in the circumferential direction and can thus flow radially outwards without losing pressure. The blow-by gas 32 flows radially inwards again into regions between the blades 56 of the impeller 52 and is again entrained in the circumferential direction so that it can be compressed again. As a result of this cycle, a pressure difference can build up between the fluid outlet 50 and the fluid inlet 48.

The compression of the blow-by gas 32 in the side channel compressor 20 takes place without sealing surfaces needing to slide on one another, so that the friction of a side channel compressor 20 is extremely low so that both the efficiency is particularly high and the lifetime is particularly long and a particle loading of the blow-by gas 32 by the side channel compressor 20 is particularly low. A side channel compressor 20 is therefore particularly well suited for driving the blow-by gas in the crankcase ventilation apparatus.

For mass production it is desirable if most of the crankcase ventilation apparatus 10, in particular the housing 34, is made or plastic or fibre-reinforced plastic. However, with plastic or fibre-reinforced plastic the required tolerances, in particular in the intermediate region 68 in which the distance between the impeller 52 and the wall of the housing 44 is small cannot be sufficiently maintained. Furthermore the required stability cannot be maintained with the aid of plastics or fibre-reinforced plastics.

For this reason, at least one insert part 70 can be provided such as is shown for example in FIGS. 7 to 10. The insert part 70 can be fabricated from a different material to the housing 44 of the side channel compressor 20 and the housing 34 of the crankcase ventilation apparatus 10. Consequently a higher-quality material can be selected which has a higher stability and allows smaller manufacturing tolerances. At the same time, the amount of high-quality material required is reduced since the entire housing 44 of the side channel compressor 20 need not be fabricated from the high-quality material.

For example, the insert part 70 is made of metal so that a hybrid design of plastic and metal is obtained for the crankcase ventilation apparatus 10. The insert part 70 can for example be made by stamping and/or bending and/or deep drawing and/or turning processes.

The at least one insert part 70 therefore forms a wall 72 of the conveying space 46, in particular in the intermediate region 68. Accordingly, the insert part 70 is configured to be annular, where the rotational symmetry is interrupted by the intermediate region 68.

Preferably the side channel compressor 20 has two insert parts 70, namely a first insert part 73 and a second insert part 74. The first insert part 73 for example is inserted in the upper part 38 of the housing 44 of the side channel compressor 20. It forms in particular an upper wall of the conveying chamber 46 in the intermediate region 68.

The second insert part 74 is inserted for example in the lower part 40 of the housing 44 of the side channel compressor 20. In the radially outer region it forms the lower side channel 66 and the intermediate region 68. In a radially inner region the second insert part 74 forms a radial bearing surface 76 on which a bearing device 78 is arranged.

The bearing device 78 preferably mounts the shaft 58 of the impeller 52. As a result, the alignment of the impeller 52 is precise due to the high precision of the second insert part 74 so that the tolerance during the positioning of the impeller 52 with respect to the wall in the intermediate region 68 can be further reduced.

In order to further improve the efficiency of the side channel compressor 20, at least one fin 80, preferably at least two fins 80 are provided, which are arranged in the side channels 62 and extend at least in sections obliquely to the circumferential direction. As a result, the fins 80 decelerate the movement of the blow-by gas 32 to be pumped in the circumferential direction so that the rotation of the blow-by gas 32 in the side channels 62 is additionally supported and as a result the pressure increase through the side channel 62 is improved. The fins 80 improve the efficiency in certain load ranges.

Figure 14:
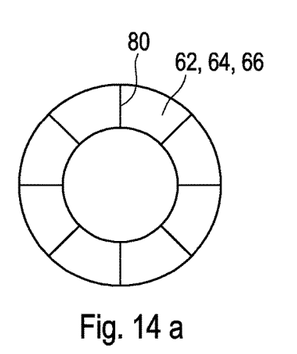
FIG. 14a-g shows a schematic view of the course of fins in the side channels.

Different profiles and arrangements of the fins 80 are feasible. In a variant shown as an example in FIG. 14*a*, the side channels have eight fins 80 which run substantially perpendicularly to the fins 80. Alternatively the fins can also run tilted thereto, as shown for example in FIG. 14*b*.

It is furthermore possible that the fins 80 do not run straight but in a bent manner. For example, the fin can run in an S-shape as shown for example in FIG. 14*c*. Furthermore, the fins 80 can have a bend. Alternatively or additionally it can also be provided for this purpose that the fins 80 have gaps as shown for example in FIGS. 14*e* and 14*f*.

The dependence of the efficiency on the working point can be improved by the differently shaped fins 80. That is, that the efficiency is less strongly dependent on the respective working point and therefore a high efficiency can be achieved over a wider range.

It can further be provided that in the upper side channel 64 more or less fins 81 are provided that fins 83 are arranged in the lower side channel 66.

Figure 15:
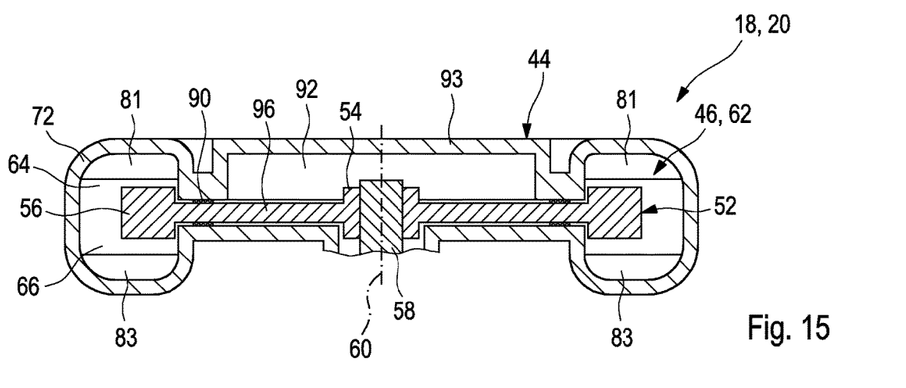
FIG. 15 shows a sectional view through a side channel compressor along the plane of intersection AA from FIG. 4 to illustrate the fins.

Finally it can also be provided that fins 81 in the upper side channel 64 and fins 83 in the lower side channel 66 are arranged offset by an angle in the circumferential direction. Furthermore it can also be provided that the fins 81 in the upper side channel 64 are differently shaped or larger or smaller than the fins 83 in the lower side channel 66, as shown for example in FIG. 15.

Due to the fins 80, chambers 82 are formed in the side channels 62 which are open towards the impeller 52. Flow vortices of the blow-by gas 32 can be formed particularly effectively in the chambers 82.

The fins 80 can, for example, be formed by the at least one insert part 70. The insert part 70 can be stamped accordingly so that a tab can be bent upwards in the insert part so that a fin 80 is formed. Furthermore the fins 80 can also be formed by parts of the housing 44, in particular by the upper part 38 or lower part 40. For example, the injection mould can be adapted accordingly.

Furthermore plastic surfaces can be injection-moulded onto the insert parts 70, 73, 74 on which the fins 80 are formed of plastic.

On the basis of its operating mode, a side channel compressor 20 functions as an oil mist separator 26 according to the inertia principle. For this reason oil from the blow-by gas 32 collects in the conveying chamber 46 of the side channel compressor 20. For this reason at least one oil drain 84 is provided through which oil can drain from the conveying chamber 46 out from the side channel compressor 20 and in particular is fed into an oil return 85 which returns the separated oil to an oil cycle. For example, the oil drain 84 guides the oil into the drive housing part 42 from which the oil from the oil return 85 is returned to the oil cycle.

Preferably the lower side channel 66 has the oil drain 84 since as a result of gravity the oil separated in the side channel compressor 20 will run into the lower side channel 66. Particularly preferably the lower side channel 66 has its own oil drain 84 for each chamber 82 so that the separated oil can drain from each of the chambers 82. In particular, the oil drains 84 are arranged in the lowest positions of the respective chambers in the direction of gravity so that none or at least only a very small amount of oil can remain in the side channel compressor 20.

As a result of this configuration of the side channel compressor 20, the side channel compressor 20 can be used as a first stage in the oil mist separation so that the crankcase ventilation apparatus 10 offers a two-stage oil mist separation. In particular, as a result of the at least one oil drain 84, it is possible for the first time that the pump device 18 and therefore the side channel compressor 20 is arranged between the crankcase 12 and the oil mist separator 26. Thus, in this way an elevated pressure compared with the ambient pressure can be generated by the pump device 18 which can be used in the inertia-based oil mist separator 26 in order to separate oil from the blow-by gas 32. Compared with the generation of negative pressure, the generation of positive pressure is advantageous since in this way higher pressure differences can be provided at the oil mist separator 26.

Figure 5:
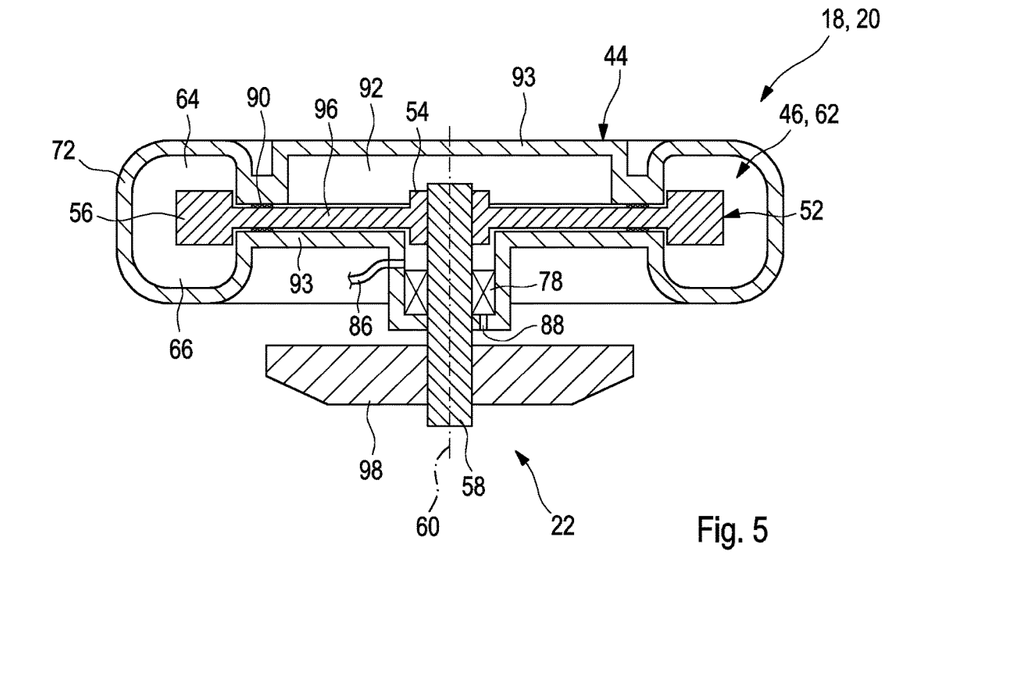
FIG. 5 shows a sectional view through the side channel compressor along the plane of intersection AA from FIG. 4.
Figure 6:
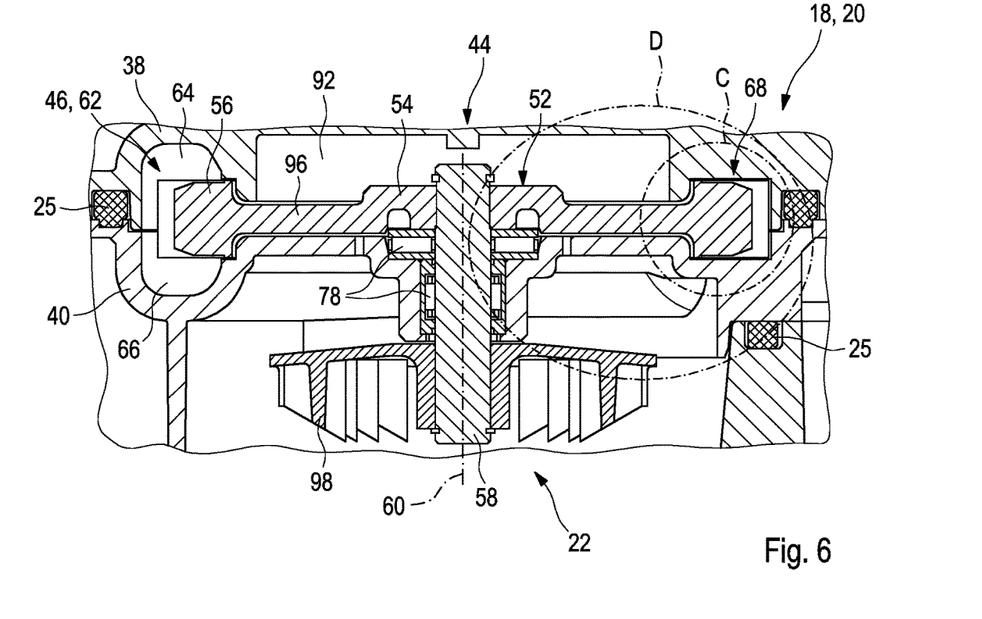
FIG. 6 shows a sectional view through the side channel compressor along the plane of intersection BB from FIG. 4.
Figure 7:
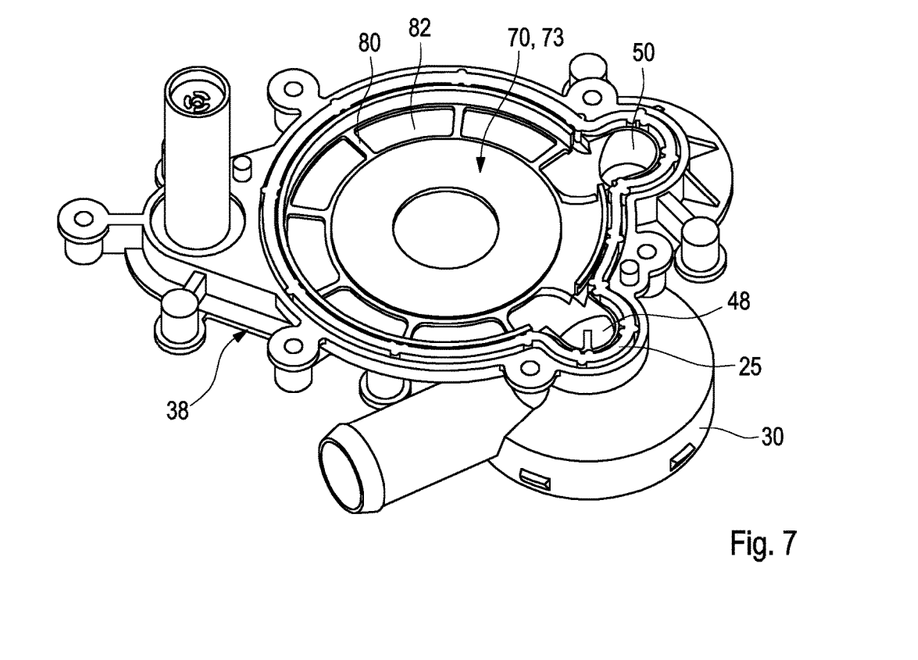
FIG. 7 shows a perspective view of a housing upper part of the side channel compressor.
Figure 8:
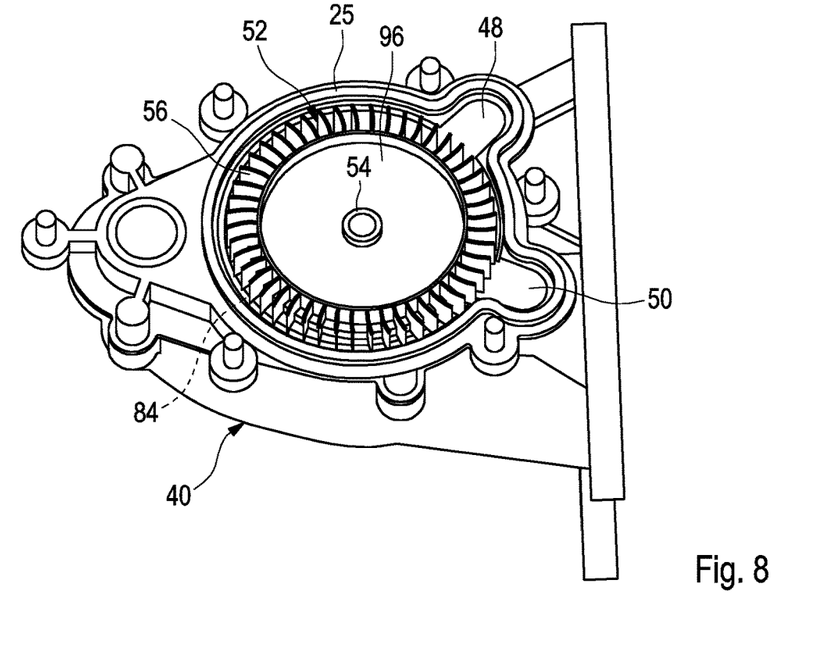
FIG. 8 shows a perspective view of a housing lower part of the side channel compressor with an impeller arranged therein.
Figure 9:
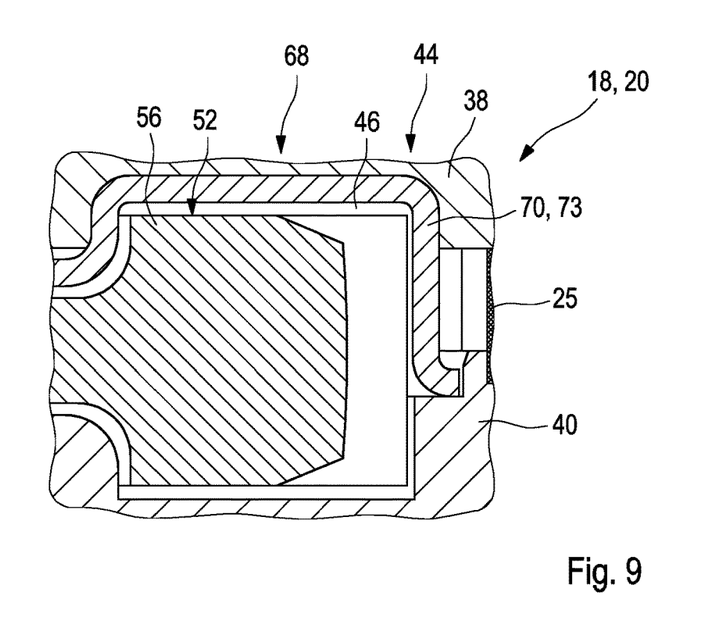
FIG. 9 shows an enlarged view of the region C from FIG. 6.
Figure 10:
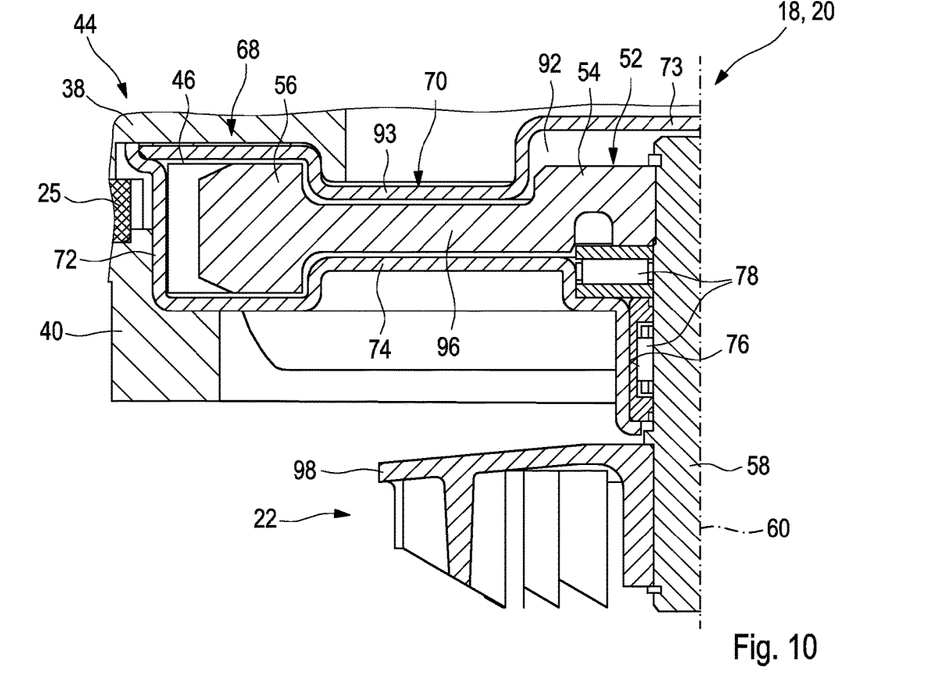
FIG. 10 shows an enlarged view of the region D from FIG. 6.
Figure 11:
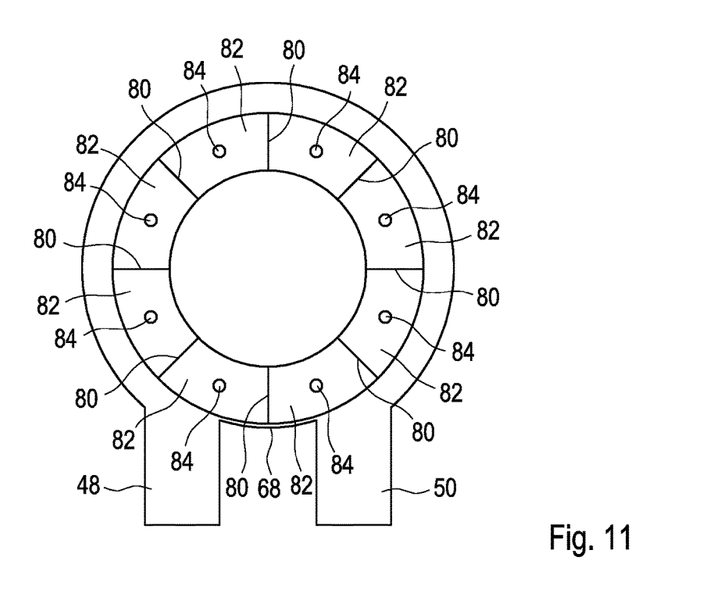
FIG. 11 shows a schematic diagram of a view of a housing part of the side channel compressor.
Figure 12:
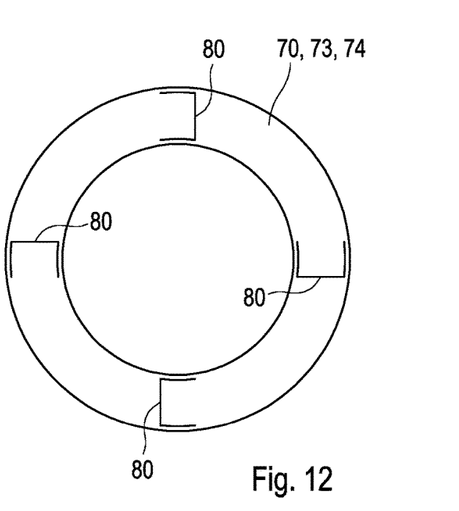
FIG. 12 shows a diagram of an insert part.
Figure 13:
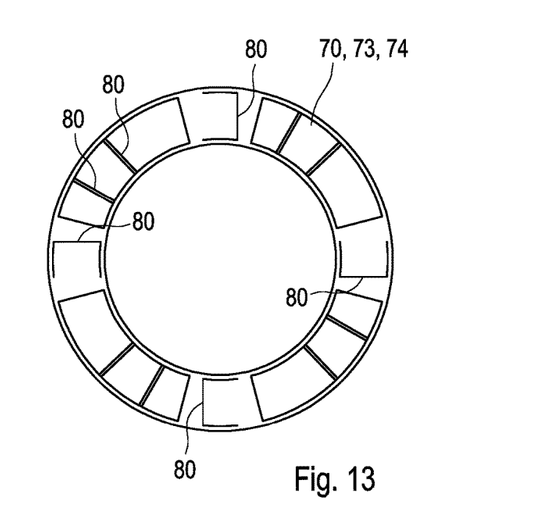
FIG. 13 shows a schematic view of another insert part.

Furthermore, the bearing device 78, as shown for example in FIG. 5 or 10, is arranged between the impeller 52 and the drive unit 22 so that a particularly compact design of the crankcase ventilation apparatus 10 is obtained. The bearing device 78 has an oil supply 86 which in particular is supplied for example from an oil drain 84 or the oil return of the oil mist separator 26. Furthermore, the bearing device 78 has an oil drain 88 so that an oil circulation can be achieved in the bearing device 78.

The bearing device 78 is in particular designed as an axial and radial bearing so that a single bearing device 78 is sufficient. Alternatively as shown for example in FIG. 6, the bearing device can also comprise an axial bearing and a separate radial bearing which however are both arranged between the impeller 52 and the drive unit 22.

The bearing device 78 mounts the shaft 58 on which the impeller 52 and for example the drive unit 22 are held in a torque-proof manner so that the oil mist separating device 24 manages with a single bearing device 78.

In particular, the bearing device 78 can comprise a ball bearing, a plain bearing, a roller bearing or a needle bearing.

As shown for example in FIG. 5, a sealing device 90 is provided which seals the conveying chamber of the side channel compressor 20 from an inner region of the side channel compressor 20 so that no unnecessary gas flow occurs in the inner region 92. The sealing device 90 is preferably formed as a labyrinth seal so that this only produces a small amount of friction.

Figure 16:
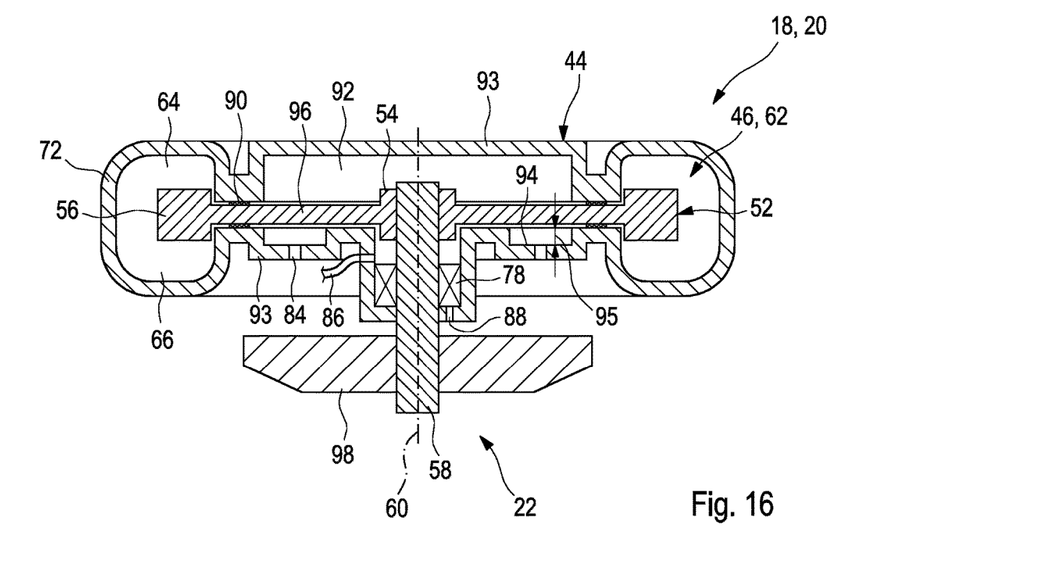
FIG. 16 shows a sectional view through a side channel compressor according to another variant, along the plane of intersection AA from FIG. 4
Figure 17:
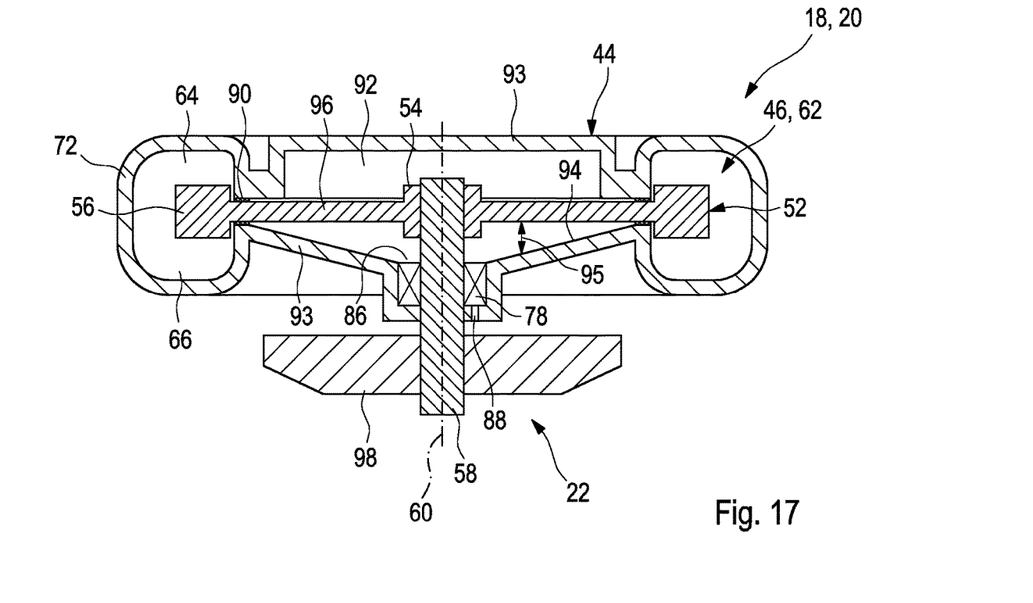
FIG. 17 shows a sectional view through a side channel compressor according to another variant, along the plane of intersection AA from FIG. 4.

In a further variant, as shown for example in FIG. 16 or 17, the side channel compressor 20 has a recess 94 in a wall 93 of the housing 44. In particular, the recess 94 is arranged in the inner region 92. The recess 94 in this case lies opposite an annular section 96 of the impeller 52 which extends between the shaft connection 54 and the blades 56. Due to the recess 94, an axial distance 95 between the impeller 52 and the wall 93 of the housing 44 is increased so that the frictional forces produced as a result of shear flows can be reduced and therefore frictional losses can be reduced.

The recess 94 can be formed by the wall 93 running obliquely to the annular section 96 of the impeller 52, as shown for example in FIG. 17. As a result, oil which collects at the wall 93 can be guided to the bearing device 78 with the result that the bearing device can be lubricated.

Furthermore, the recess 94 can be formed by the wall 93 running in a bent manner and thus forming a depression or by running in a stepped manner, as shown for example in FIG. 16.

The inertia-based oil mist separator 26 of the oil mist separating device 24 is configured as an impactor 28 and can also separate other liquids. At the impactor 28, the gas flow to be purified, for example the blow-by gas 32, is guided through at least one nozzle which is located opposite a baffle plate so that the gas flow is deflected directly after the nozzle. Due to the nozzle the gas flow acquires a high velocity so that the liquid droplets, hereinafter called oil droplets, cannot follow the deflection by the baffle plate and impinge on the baffle plate and remain suspended there and are thus separated from the gas flow.

Furthermore the impactor 28 comprises a poppet valve which is closed in a spring-loaded manner wherein the poppet valve opens when a pressure difference between valve inlet and valve outlet is exceeded. In this case, the poppet valve forms an annular flow gap which also functions as a nozzle and accelerates the gas flow flowing through the impactor 28, for example the blow-by gas 32. The annular flow gap is surrounded by a cylindrical baffle plate which deflects the gas flow flowing through the annular flow gap and thus enables a separation of oil droplets from the gas flow there. Since the poppet valve opens with increasing pressure difference, the flow cross-section of the impactor is increased and thus the flow cross-section of the oil mist separating device 24 is enlarged. The flow cross-section is composed of the cross-section of all the nozzles and the flow area of the annular flow gap.

The oil mist separating device 24 has an oil drain 97 which fluidically connects the cover 36 to the drive housing part 42. The oil separated by the oil mist separator 26, here impactor 28, is supplied to the oil drain 97. Through the oil drain 97, the oil can drain into the drive housing part 42 and from there return via the oil return 85 to the oil cycle.

The drive unit 22 for example comprises a turbine wheel 98 which is held on the shaft 58 in a torque-proof manner. Thus, the turbine wheel 98 can drive the impeller 52 of the side channel compressor 20. Furthermore the turbine wheel 98 is also mounted by the bearing device 78 by means of which the shaft 58 is mounted so that a compact design is achieved.

For example, the turbine wheel 98 is driven by oil which is guided via a nozzle 100 onto the turbine wheel 98. A hydraulic system is usually already provided in internal combustion engines 14 so that the drive unit 22 can be implemented cost-effectively. In particular, the turbine wheel can be formed as a Pelton turbine wheel.

Since oil which drives the turbine wheel 98 collects in the drive housing part 42, the oil can be returned via the oil return 85 to the oil cycle. As a result, the oil guided by the oil mist separating device 24 into the drive housing part 42 and the oil guided from the side channel compressor 20 into the drive housing part 42 together with the oil used to drive the turbine wheel 98 can be returned through the oil return 85 to the oil cycle.

As a result, oil lines can be saved so that a cost-effective and compact design is obtained.

The invention claimed is:

1. A pump device for driving blow-by gas in a crankcase ventilation apparatus, comprising a side channel compressor including:
   a housing having a conveying chamber, a fluid inlet, and a fluid outlet, each extending in a circumferential direction and positioned at an axial location of the pump device;
   having blades radially on an outside and which is mounted rotatably in the housing, wherein the blades lie in the conveying chamber at the axial location;
   a shaft mounted rotatably about an axis of rotation and on which an impeller is fastened;
   wherein the conveying chamber has at least one side channel that runs in a region of the blades and connects the fluid inlet and the fluid outlet to one another in the circumferential direction; and
   wherein an intermediate region is formed at the axial location and in the circumferential direction between the fluid outlet and the fluid inlet and in which a distance of the blades in an axial direction to the nearest wall is such that no more than a predetermined amount of fluid flows in the intermediate region.

2. The pump device according to claim 1, further comprising at least one oil drain through which oil is drainable from the conveying chamber.

3. The pump device according to claim 2, wherein the at least one oil drain is arranged at a lowest point of the conveying chamber in a direction of gravity.

4. The pump device according to claim 2, wherein the oil drain guides oil separated in the side channel compressor into an oil return, which returns the oil to an oil cycle.

5. The pump device according to claim 1, further comprising at least one fin in the at least one side channel, the at least one fin separating at least two chambers open towards the impeller from one another.

6. The pump device according to claim 1, wherein the housing has an at least one insert into the conveying chamber, wherein the housing and at least one insert have different materials.

7. The pump device according to claim 1, wherein at least one of:
   the pump device has two opposite side channels;
   at least one fin is arranged in each side channel, the at least one fin extending at least in sections obliquely to a circumferential direction; and
   at least two chambers open to the impeller are arranged in each of the two side channels.

8. The pump device according to claim 1, further comprising a drive unit coupled to the shaft.

9. The pump device according to claim 8, wherein the drive unit includes a turbine wheel that is held in a torque-proof manner to and on the shaft.

10. A crankcase ventilation apparatus comprising:
   an inertia-based oil mist separator; and
   a pump device having a side channel compressor that includes:
      a housing having a conveying chamber, a fluid inlet, and a fluid outlet, each extending in a circumferential direction and positioned at an axial location of the pump device;
      an impeller having blades radially on an outside and which is mounted rotatably in the housing, wherein the blades lie in the conveying chamber at the axial location;
      a shaft mounted rotatably about an axis of rotation and on which the impeller is fastened;
      wherein the conveying chamber has at least one side channel that runs in a region of the blades and connects the fluid inlet and the fluid outlet to one another in a circumferential direction; and
      wherein an intermediate region is formed at the axial location and in the circumferential direction between the fluid outlet and the fluid inlet and in which a distance of the blades in an axial direction to the nearest wall is such that no more than a predetermined amount of fluid flows occur in the intermediate region.

11. The crankcase ventilation apparatus according to claim 10, wherein the inertia-based oil mist separator is arranged downstream of the pump device, wherein the inertia-based oil mist separator includes an oil drain that guides oil separated in the oil mist separator to an oil return.

12. The crankcase ventilation apparatus according to claim 10, wherein the inertia-based oil mist separator is an impactor.

13. The crankcase ventilation apparatus according to claim 11, wherein the oil drain guides the oil into a drive housing part of the crankcase ventilation apparatus, and wherein the oil return returns oil from the drive housing part into an oil cycle.

14. A pump device for driving blow-by gas in a crankcase ventilation apparatus, comprising:
   a side channel compressor that includes:
      a housing having a conveying chamber, a fluid inlet, and a fluid outlet, each extending in a circumferential direction and positioned at an axial location of the pump device;
      an impeller having blades radially on an outside and which is mounted rotatably in the housing, wherein the blades lie in the conveying chamber;

a shaft mounted rotatably about an axis of rotation and on which the impeller is fastened;

wherein the conveying chamber has at least one side channel that runs in a region of the blades and connects the fluid inlet and the fluid outlet to one another in the circumferential direction; and wherein an intermediate region is formed at the axial location and in the circumferential direction between the fluid outlet and the fluid inlet and in which a distance of the blades in an axial direction to the nearest wall is such that no more than a predetermined amount of fluid flows occur in the intermediate region; and at least one oil drain arranged at a lowest point of the conveying chamber in a direction of gravity, the oil drain guiding oil separated in the side channel compressor from the conveying chamber into an oil return that returns the oil to an oil cycle.

15. The pump device according to claim 14, wherein at least one of:

the pump device has two opposite side channels;

at least one fin is arranged in each side channel, the at least one fin extending at least in sections obliquely to a circumferential direction; and at least two chambers open to the impeller are arranged in each of the two side channels.

16. The pump device according to claim 1, wherein the at least one side channel includes a radially inner surface and a radially outer surface, and the impeller is positioned between the radially inner surface and the radially outer surface, and wherein the fluid inlet and the fluid outlet are positioned radially external to at least the radially inner surface.

17. The pump device according to claim 16, wherein the fluid inlet and the fluid outlet are positioned approximately within a common plane with one another, wherein the fluid inlet is positioned such that fluid enters the fluid inlet along the common plane, and wherein the fluid outlet is positioned such that fluid exits the fluid outlet along the common plane.

18. The crankcase ventilation apparatus according to claim 10, wherein the at least one side channel includes a radially inner surface and a radially outer surface, and the impeller is positioned between the radially inner surface and the radially outer surface, and wherein the fluid inlet and the fluid outlet are positioned radially external to at least the radially inner surface.

19. The crankcase ventilation apparatus according to claim 18, wherein the fluid inlet and the fluid outlet are positioned approximately within a common plane with one another, wherein the fluid inlet is positioned such that fluid enters the fluid inlet along the common plane, and wherein the fluid outlet is positioned such that fluid exits the fluid outlet along the common plane.

20. The pump device according to claim 14, wherein the at least one side channel includes a radially inner surface and a radially outer surface, and the impeller is positioned between the radially inner surface and the radially outer surface, wherein the fluid inlet and the fluid outlet are positioned radially external to at least the radially inner surface, wherein the fluid inlet and the fluid outlet are positioned approximately within a common plane with one another, wherein the fluid inlet is positioned such that fluid enters the fluid inlet along the common plane, and wherein the fluid outlet is positioned such that fluid exits the fluid outlet along the common plane.

* * * * *